(12) United States Patent
Pausch et al.

(10) Patent No.: US 6,334,625 B1
(45) Date of Patent: Jan. 1, 2002

(54) FLAME PROTECTION DEVICE FOR AIR BAGS IN AIR BAG MODULES

(75) Inventors: Tobias Pausch; Dieter Markfort, both of Berlin (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 09/445,995

(22) PCT Filed: Jun. 19, 1998

(86) PCT No.: PCT/DE98/01761

§ 371 Date: Dec. 16, 1999

§ 102(e) Date: Dec. 16, 1999

(87) PCT Pub. No.: WO98/58823

PCT Pub. Date: Dec. 30, 1998

(30) Foreign Application Priority Data

Jun. 23, 1997 (DE) .............................................. 197 27 832

(51) Int. Cl.⁷ .................................................... B60R 21/24
(52) U.S. Cl. ........................................ 280/729; 280/743.1
(58) Field of Search ................................. 280/729, 728.1, 280/740, 743.1

(56) References Cited

U.S. PATENT DOCUMENTS

| | | | |
|---|---|---|---|
| 3,731,949 A | | 5/1973 | Radke ............................ 280/150 |
| 3,792,873 A | * | 2/1974 | Buchner et al. ............... 280/729 |
| 5,454,589 A | * | 10/1995 | Bosio et al. ................... 280/729 |
| 5,458,366 A | | 10/1995 | Hock et al. .................... 280/729 |
| 5,570,900 A | | 11/1996 | Brown ........................... 280/729 |
| 5,582,429 A | * | 12/1996 | Heinz et al. |
| 5,788,270 A | * | 8/1998 | Haland et al. ................. 280/729 |
| 5,884,937 A | | 3/1999 | Yamada ....................... 280/730.2 |
| 5,918,902 A | | 7/1999 | Acker et al. ............... 280/743.1 |
| 5,941,559 A | * | 8/1999 | Rudolf et al. ................. 280/729 |
| 6,000,715 A | * | 12/1999 | Tschaeschke ............. 280/729 X |
| 6,010,149 A | * | 1/2000 | Reidel et al. ............... 280/729 X |
| 6,032,977 A | * | 3/2000 | Reh et al. ...................... 280/729 |
| 6,042,141 A | * | 3/2000 | Welch et al. .................. 280/729 |
| 6,073,961 A | * | 6/2000 | Bailey et al. .............. 280/729 X |
| 6,155,596 A | * | 12/2000 | Nakajima et al. ......... 280/730.2 |
| 6,176,514 B1 | * | 1/2001 | Einsiedel .................... 280/730.2 |
| 6,199,898 B1 | * | 3/2001 | Masuda et al. ............ 280/730.2 |
| 6,237,937 B1 | * | 5/2001 | Kokeguchi et al. ... 280/743.1 X |
| 6,270,113 | * | 8/2001 | Wipasuramonton et al. ...... 280/730.1 |

FOREIGN PATENT DOCUMENTS

| | | |
|---|---|---|
| DE | 22 22 621 | 11/1972 |
| DE | 40 28 344 | 4/1991 |
| DE | 41 21 659 | 1/1993 |
| DE | 296 06 709 | 9/1996 |
| DE | 296 14 201 | 11/1996 |
| DE | 196 47 679 | 6/1997 |
| EP | 0 422 840 | 4/1991 |
| EP | 0 600 598 A1 | 6/1994 |
| EP | 0 677 433 | 10/1995 |
| GB | 22 37 248 | 5/1991 |
| WO | 90/09295 | * 8/1990 |
| WO | 99/06246 | * 2/1999 |

* cited by examiner

*Primary Examiner*—Brian L. Johnson
*Assistant Examiner*—Bryan Fischmann
(74) *Attorney, Agent, or Firm*—Foley & Lardner

(57) ABSTRACT

A flame protection device for gas bags in air bag modules that use a gas generator. The air bags have at least one dart, and the flame protection device can be folded along with the air bag. A member guiding the gas jet of the gas generator is provided as a flame protection device, the member being arranged and configured in such a way that the gas circulating between the darts flows in at least an approximately parallel direction to the darts.

11 Claims, 3 Drawing Sheets

FLAME PROTECTION DEVICE FOR AIR BAGS IN AIR BAG MODULES

FIELD OF THE INVENTION

The invention relates to a flame protection device for gas bags in airbag modules.

BACKGROUND OF THE INVENTION

It is known that darts (the joining of two pieces) are often provided in gas bags of airbag modules in order to restrict the expansion of the gas bag. When these darts are located directly adjoining the gas generator they are heavily stressed thermally by the hot gas jet.

It is known to protect heavily thermally stressed parts of the gas bag by attaching additional parts as flame protection to protect the thermally stressed parts against the impact of the hot gases. Thus, an airbag is known from German Patent DE 41 21 659 C2 where a gas generator cover is attached over the gas generator. This cover is to prevent direct contact between the gas generator and the gas bag fabric during inflation. The gas can thereby flow into the gas bag both through openings at the front of the cover and at the side of the cover. This cover is not suitable for the particular flame protection of darts in the gas bag.

SUMMARY OF THE INVENTION

The objective of the invention is to reduce the thermal stresses on the seams, and more particularly on the darts in gas bags.

A flame protection device for gas bags in airbag modules which use a gas generator is provided for gas bags with at least one dart. The flame protection device can be folded along with the gas bag. According to the invention, at least one part which directs or diverts the gas jet of the gas generator is provided as a flame protection device. It is arranged and formed so that the gas flows between the darts at least approximately in the direction of these darts.

With this flame protection device, flame protection is achieved in that the hot gases do not hit the seams but are diverted and run in the direction of the seams. A special protection of the seams is thereby not necessary.

In a preferred embodiment, it is proposed that the diverting part is formed as a tubular hose which has at least one outlet opening for the gases leaving the gas generator. This embodiment is suitable for protecting differently aligned darts.

In one embodiment, it is proposed that the darts run at least approximately parallel to each other so that the tubular hose runs transversely relative to the darts and has at least one gas outlet opening between the darts. With this configuration, after emerging from the gas generator the gas is thus first directed in the direction of the darts, but exits through the relevant gas outlet opening between the darts at least approximately in a direction corresponding to the course of the darts. The thermal strain on the darts is thus greatly reduced.

With this arrangement, the tubular hose can be mounted at one end of the darts. In this case, the hose has gas outlet openings on one side. The tubular hose can however also run along both sides of the darts. In this case, the tubular hose therefore has gas outlet openings on opposite sides.

Another possibility exists where the tubular hose runs between the darts in the direction thereof and has at least one gas outlet opening on the end side.

The tubular hose used in the preferred embodiment can be formed in a different way. Thus, in a first embodiment the tubular hose can be formed between a fabric layer folded in the longitudinal direction so that the superposed free edges are connected to the outer edge of the gas bag. In the case of a gas bag consisting of an upper part and a lower part, the edges of the fabric layer of the tubular hose are stitched to the edges of the upper and lower parts. With this embodiment the tubular hose thus arises with the gas bag.

Furthermore, the tubular hose can be made so that one edge of a separate fabric layer is connected to the circumferential seam of the gas bag and the edge opposite this edge is connected to a section of an upper or lower part of the gas bag, or so that one edge of a fabric layer is connected to the upper part and the opposite edge is connected to the lower part.

The tubular hose can also be formed from a section of the gas bag so that an inverted area is provided in the gas bag and has a common edge seam with the gas bag.

Finally a separate tubular hose can also be provided which is connected to the gas bag on at least one side.

DESCRIPTION OF THE DRAWINGS

The invention will now be explained in further detail with reference to the embodiments shown in the drawings in which.

DETAILED DESCRIPTION

Figure 1:
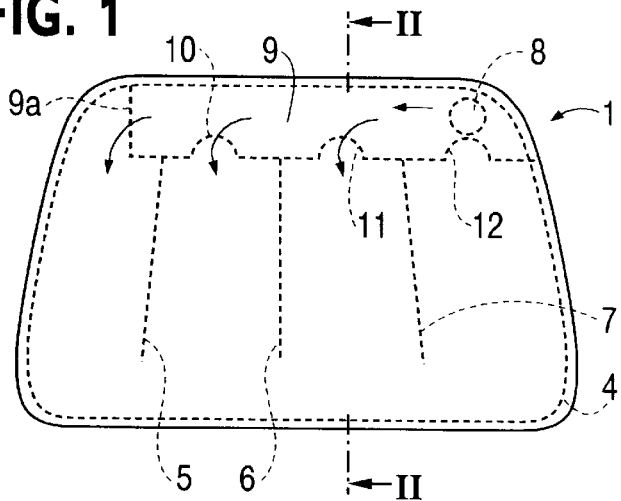
FIG. 1 is a plan view of a gas bag with vertically aligned darts and a tubular hose running on one side across same.
Figure 2:
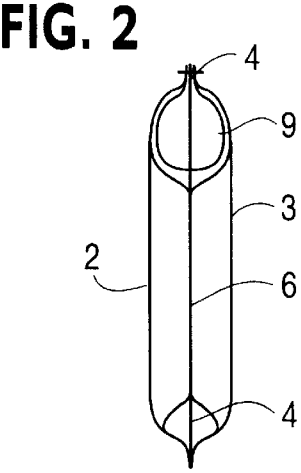
FIG. 2 is a sectional view through FIG. 1, seen in the direction of arrows II—II.

In FIGS. 1 and 2, a gas bag 1 is shown which consists of an upper part 2 and a lower part 3. The two parts are connected together by a marginal seam 4. In addition, both parts are connected by three vertically aligned darts 5, 6, 7. The gas bag has a blow-in mouth 8 which is connected to a gas generator (not shown). A tubular hose 9 acting as the flame protection is provided above the darts 5, 6, 7 and is attached to the blow-in mouth 8. The tubular hose 9 has gas outlet openings 10, 11, 12 between the darts and a gas outlet opening 9a on the end side.

Figure 3:
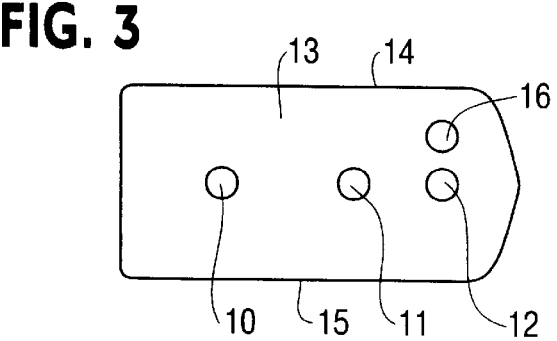
FIG. 3 is a plan view of the fabric layer for producing the tubular hose according to FIGS. 1 and 2.

The tubular hose 9 consists of one fabric layer 13 (FIG. 3) which is folded so that the edges 14, 15 lie on one another. These edges and the right end side are stitched together with the upper part 2 and lower part 3 by means of the marginal seam 4, as can be seen in particular from FIG. 2. The fabric layer 13 has an aperture 16 which is connected to the blow-in mouth 8.

The flow path of the hot gases entering through the mouth can be seen from FIG. 1. The gases in the present illustration enter into the hose 9 perpendicular to the surface of the paper and are deflected there in the direction of the gas outlet openings 10 to 12. On emerging from these openings the flow direction changes again so that the gases flow roughly parallel to the darts 5 to 7.

Figure 4:
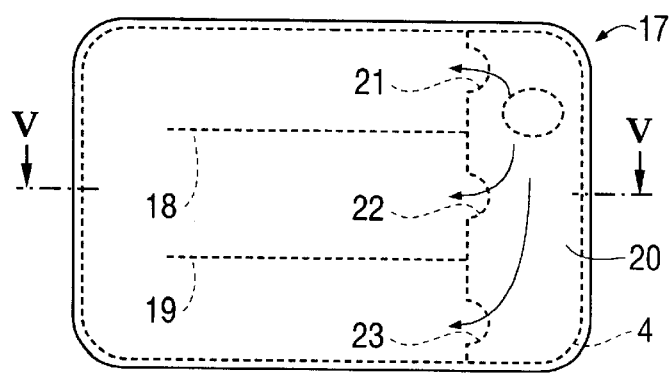
FIG. 4 is a plan view of a gas bag with horizontally aligned darts and a tubular hose running across same on one side.
Figure 5:
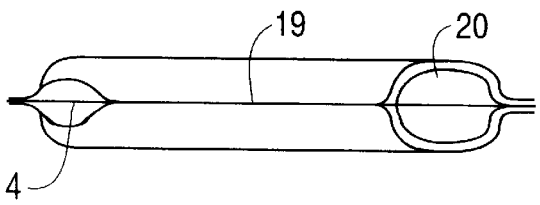
FIG. 5 is a sectional view through FIG. 4, seen in the direction of arrows V—V.

In FIGS. 4 and 5 a gas bag 17 is shown having two horizontal darts 18, 19 and a vertical tubular hose 20 as flame protection running on the right next to the darts. This hose has three gas outlet openings 21, 22, 23. The deflection of the flow takes place in the same way as with the embodiment of FIGS. 1 to 3. The hose also consists as with this embodiment of one fabric layer which in the folded position is stitched to the gas bag along the edge by means of the marginal seam 4.

Figure 6:
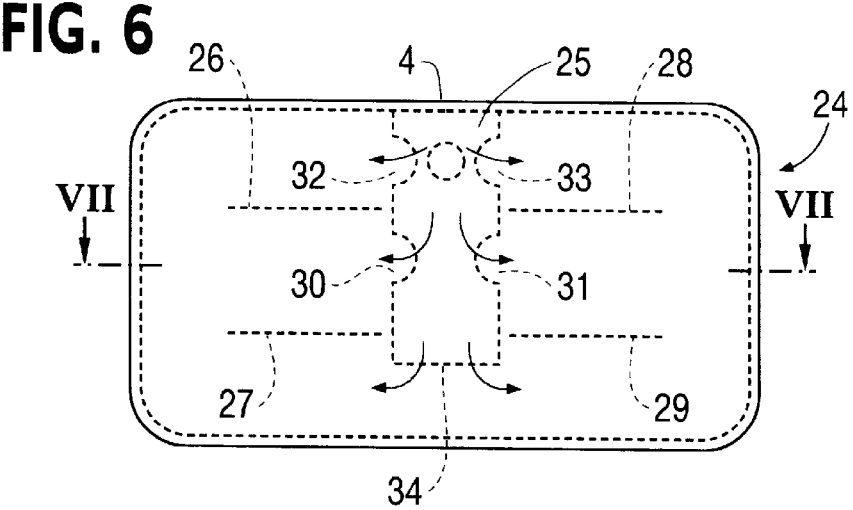
FIG. 6 is a plan view of a gas bag wherein a hose lies on each side of darts.
Figure 7:
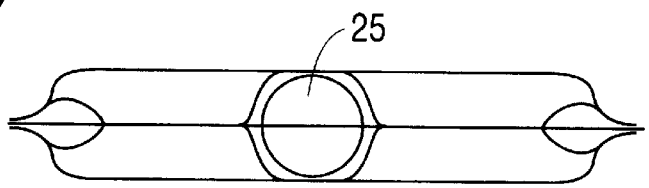
FIG. 7 is a sectional view through FIG. 6, seen in the direction of arrows VII—VII.

With the embodiment of FIGS. 6 and 7 a gas bag 24 is shown wherein a tubular hose 25 is provided as flame protection and is arranged in the middle of the gas bag where it is fixed by an end side on the gas bag by means of the marginal seam 4. Darts 26 to 29 are provided on either side of the tubular hose which extends transversely through the gas bag. The gas bag has gas outlet openings 30 and 31 on opposite sides between the darts and gas outlet openings 32 to 34 between the darts and the marginal seam 4. The hot gases are diverted in the direction of the darts as described with the previous embodiments.

Figure 8:
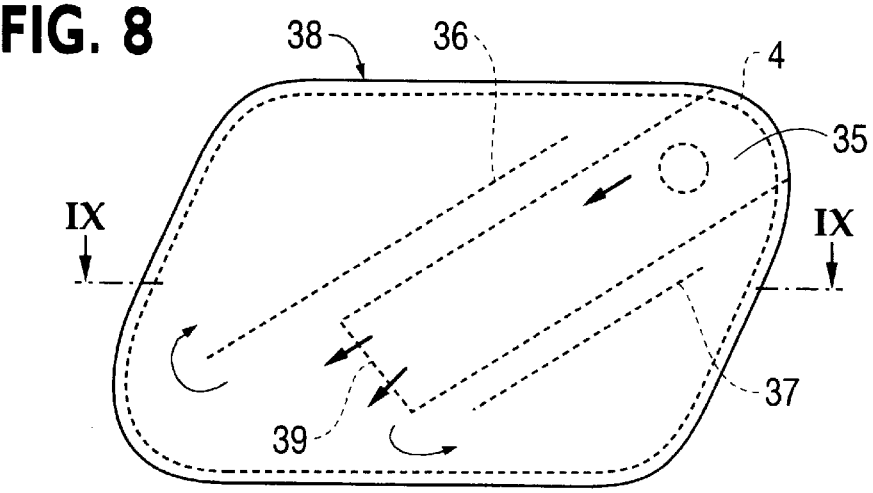
FIG. 8 is a plan view of a gas bag wherein the tubular hose runs between two darts.
Figure 9:
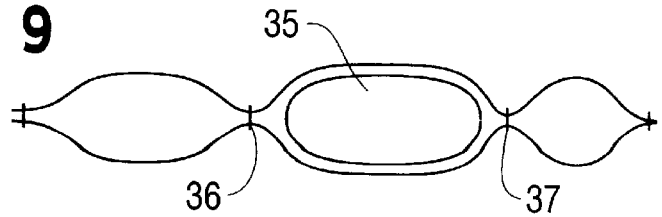
FIG. 9 is a sectional view through FIG. 8, seen in the direction of arrows IX—IX.

With the embodiment of FIGS. 8 and 9 a tubular hose 35 extends parallel to darts 36, 37 into a gas bag 38. The tubular hose is fixed along one end side by the marginal seam 4 to the gas bag and has a gas outlet opening 39 on the other end side.

Figure 10:
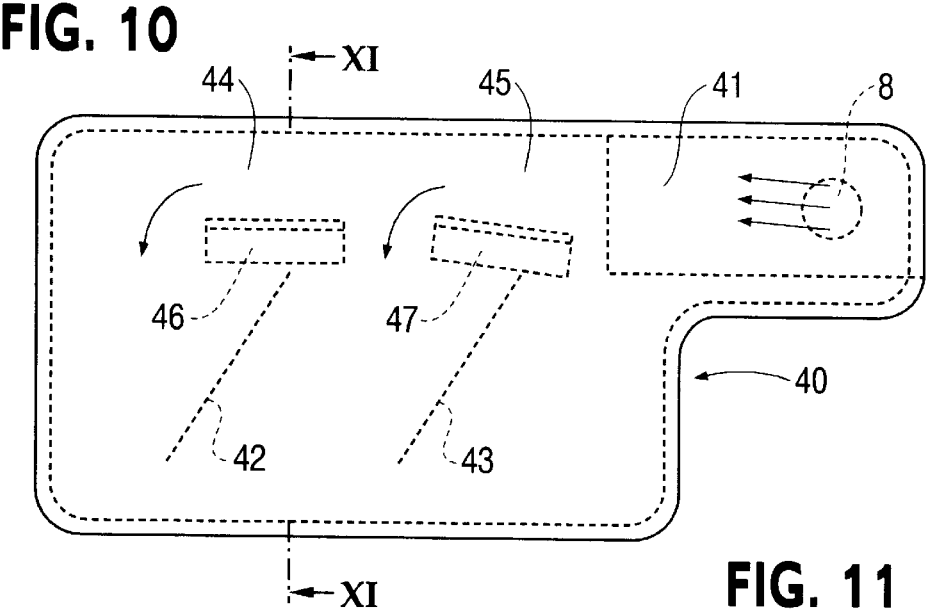
FIG. 10 is a plan view of a gas bag with combined flame protection.
Figure 11:
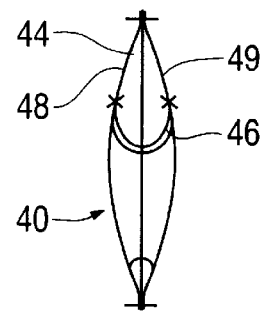
FIG. 11 is a sectional view through FIG. 10, seen in the direction of arrows XI—XI.

In FIGS. 10 and 11 a gas bag 40 is shown which has several tubular hoses as flame protection. Thus one tubular hose 41 is provided in the area of the blow-in mouth 8. Additionally, hose-like sections 44, 45 are provided above the darts 42, 43. These hose-like sections are in the present case formed by fixing fabric layers 46, 47 on an upper part 48 and a lower part 49 of the gas bag. Thus the hose-like section 44, 45 is formed between the relevant fabric part and the upper and lower part respectively.

Figure 12:
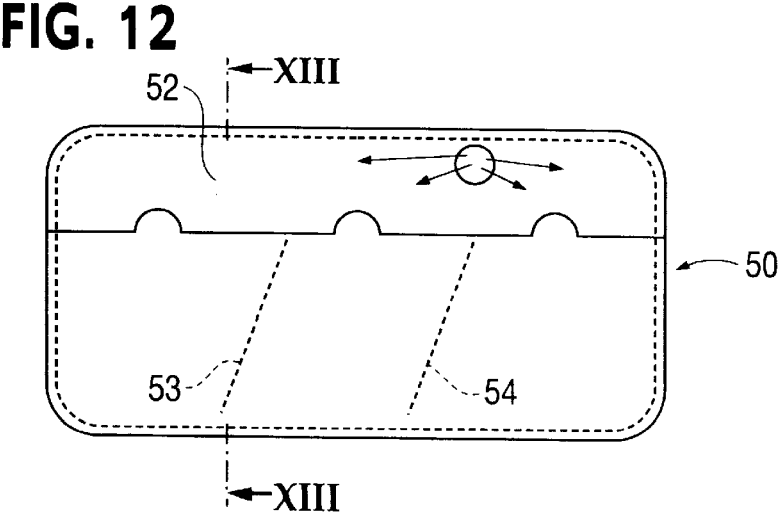
FIG. 12 is a plan view of a gas bag wherein the tubular hose is formed by inverting the gas bag.
Figure 13:
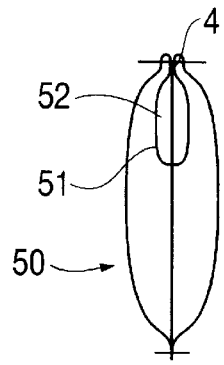
FIG. 13 is a sectional view through the gas bag of FIG. 12, seen in the direction of arrows XIII—XIII.

A further form of the tubular hose is shown in FIGS. 12 and 13. In this case a gas bag 50 has on one side a turned-in area 51 as can be seen from FIG. 13. This turning is stitched at the edge by the marginal seam 4 to the gas bag so that a tubular hose 52 is formed. This hose runs on one side transversely to the darts 53, 54. The method of activation corresponds to that already described for the previous embodiments.

What is claimed is:

1. A gas bag defining a chamber and having at least one dart and a flame protection device for an airbag module that uses a gas generator for producing a gas jet, wherein the flame protection device comprises a tubular hose contained in the gas bag chamber for directing the gas jet from the gas generator, and wherein the tubular hose is foldable with the gas bag and comprises a fabric layer folded longitudinally with respect to the gas bag so that edges of the fabric layer are superposed, with the superposed edges of the fabric layer being connected to an outer edge of the gas bag.

2. The gas bag according to claim 1, comprising at least two darts, wherein the darts run at least approximately parallel to each other, and the tubular hose runs transversely relative to the darts and has at least one gas outlet opening between the darts.

3. The gas bag according to claim 2, wherein the tubular hose is mounted at one end of the darts.

4. The gas bag according to claim 1, wherein the tubular hose is mounted at one end of the dart.

5. The gas bag according 1, wherein the tubular hose runs on each side of the dart.

6. The gas bag according to claim 1, comprising at least two darts, wherein the tubular hose has a generator end and a distal end and extends between the two darts, and has a gas outlet opening at the distal end of the tubular hose.

7. The gas bag according to claim 1, wherein edges of the gas bag and the edges of the fabric layer of the tubular hose are stitched together.

8. The gas bag according to claim 1, wherein the tubular hose is connected to the gas bag on at least one side.

9. A gas bag comprising an upper part and a lower part and having a seam along a periphery thereof connecting the upper and lower parts, and defining a chamber having at least one dart and a flame protection device for an airbag module that uses a gas generator for producing a gas jet, wherein the flame protection device comprises a tubular hose contained in the gas bag chamber for directing the gas jet from the gas generator, and is foldable along with the gas bag, and wherein the tubular hose is formed by a fabric layer by connecting one edge of the fabric layer to the peripheral seam of the gas bag and connecting the edge opposite this edge to a section of the upper or lower part of the gas bag.

10. A gas bag comprising an upper part and a lower part, and defining a chamber therebetween having at least one dart and a flame protection device for an airbag module that uses a gas generator for producing a gas jet, wherein the flame protection device comprises a tubular hose contained in the gas bag chamber for directing the gas jet from the gas generator, and is foldable along with the gas bag, and wherein the hose comprises a fabric layer having one edge connected to the upper part and having an opposite edge connected to the lower part.

11. A gas bag having a marginal seam along its periphery and defining a chamber and having at least one dart and a flame protection device for an airbag module that uses a gas generator for producing a gas jet, wherein the flame protection device comprises a tubular hose contained in the gas bag chamber for directing the gas jet from the gas generator, and wherein the tubular hose is foldable with the gas bag, and comprises a turned-in area of the gas bag and connected along the marginal seam of the gas bag.

* * * * *